US 8,591,845 B2

(12) United States Patent
Princivalle et al.

(10) Patent No.: US 8,591,845 B2
(45) Date of Patent: Nov. 26, 2013

(54) ELECTROCHEMICAL CATALYSIS SYSTEM

(75) Inventors: Agnes Princivalle, Lagnes (FR);
Philippe Vernoux, Rochetaillee sur Saone (FR); Abdelkader Hadjar, Saint-Etienne (FR); Christian Guizard, Cournonterral (FR)

(73) Assignees: Saint-Gobain Centre de Recherches et d'Etudes Europeen, Courbevoie (FR); Centre National de la Recherche Scientifique, Paris (FR); Universite Claude Bernard-Lyon 1, Villeurbanne (FR)

( * ) Notice: Subject to any disclaimer, the term of this patent is extended or adjusted under 35 U.S.C. 154(b) by 0 days.

(21) Appl. No.: 13/700,880

(22) PCT Filed: Jun. 16, 2011

(86) PCT No.: PCT/FR2011/051381
§ 371 (c)(1),
(2), (4) Date: Feb. 13, 2013

(87) PCT Pub. No.: WO2011/157964
PCT Pub. Date: Dec. 22, 2011

(65) Prior Publication Data
US 2013/0136676 A1 May 30, 2013

(30) Foreign Application Priority Data
Jun. 16, 2010 (FR) ..................... 10 54780

(51) Int. Cl.
*B01D 53/56* (2006.01)
*B01D 53/94* (2006.01)

(52) U.S. Cl.
USPC ......... 423/213.2; 423/239.1; 60/274; 60/299; 60/301

(58) Field of Classification Search
USPC ............... 423/213.2, 239.1; 60/274, 299, 301
See application file for complete search history.

(56) References Cited

U.S. PATENT DOCUMENTS

| 4,839,146 | A | | 6/1989 | Cho et al. |
| 5,837,642 | A | * | 11/1998 | Tanaka et al. ................. 502/304 |
| 6,576,200 | B1 | | 6/2003 | Yamamoto et al. |
| 6,831,036 | B1 | | 12/2004 | Yamazaki et al. |

FOREIGN PATENT DOCUMENTS

| EP | 0 287 217 | 10/1988 |
| EP | 0 988 890 | 3/2000 |
| JP | 2001 058130 | 3/2001 |
| JP | 2001 145820 | 5/2001 |
| JP | 2002 210365 | 7/2002 |

OTHER PUBLICATIONS

International Search Report Issued Oct. 7, 2011 in PCT/FR11/051381 Filed Jun. 16, 2011.

* cited by examiner

*Primary Examiner* — Timothy Vanoy
(74) *Attorney, Agent, or Firm* — Oblon, Spivak, McClelland, Maier & Neustadt, L.L.P.

(57) ABSTRACT

The present invention relates to the use, for the reduction of oxidizing contaminating entities of the $NO_x$ type, in particular $NO_2$, present in a gas to be purified, of a catalytic system comprising or composed of an oxide corresponding to the molar formulation:

$$Ce_{1-y-z}O_{2-x}M_yN_z,$$

in which:
Ce is cerium,
M is an element chosen from: Gd, Y, Sc, Sm, La, Pr, Nd, Er or Tb,
y is between 0.01 and 0.4,
N is an element having several degrees of valency chosen from: Ti, V, Cr, Mn, Fe, Co, Ni or Cu,
z is less than 0.4,
x is greater than 0.05.

13 Claims, No Drawings

ELECTROCHEMICAL CATALYSIS SYSTEM

The present invention relates to the field of the purification of a gas laden with gaseous contaminants essentially of the $NO_x$ type. More particularly, the invention relates to catalytic systems for the treatment of gases, in particular at the exhaust outlet of a diesel or gasoline engine, which make possible the removal of said contaminating entities by reduction of said entities of the $NO_x$ type.

The techniques and the problems related to the purification of contaminated gases, in particular at the outlet of exhaust lines of gasoline or diesel motor vehicles, are well known in the art. A conventional three-way catalyst makes possible the joint treatment of $NO_x$, CO and HC contaminants and their conversion into neutral and chemically harmless gases, such as $N_2$, $CO_2$ and $H_2O$. However, a very good efficiency of the system is achieved only by continual adjusting of the richness of the air/fuel mixture. It is thus known that the slightest deviation with respect to the stoichiometry of the mixture brings about a strong increase in the emissions of the contaminants.

In order to solve this problem, provision has been made to incorporate, in the catalyst, materials which make it possible to temporarily fix the $NO_x$ compounds (often known in the art as $NO_x$ trap) when the mixture is lean (that is to say, substoichiometric in fuel, in other words superstoichiometric in oxygen). However, the major disadvantage of such a system is that the reduction of the $NO_x$ compounds can be achieved only at the cost of an overconsumption of fuel. Specifically, the desorption of the $NO_x$ compounds trapped in the catalyst and their catalytic reduction to give gaseous nitrogen $N_2$ can only be obtained in the presence, at the reduction catalyst, of a sufficient amount of the reducing entities in the form of hydrocarbons or carbon monoxide CO or gaseous hydrogen $H_2$, it being possible for the gaseous hydrogen itself to be obtained by a catalytic reaction between the hydrocarbons HC and steam or between CO and steam.

According to a different approach, the U.S. Pat. No. 6,878,354 describes a combination of catalysts for the oxidation of HC compounds and CO and for the reduction of the $NO_x$ compounds electrochemically. Such systems appear advantageous as they make possible an electrochemical reaction between the reduction catalyst A and the oxidation catalyst B connected to one another both by an electron conductor C and an ion conductor D. According to this publication, such a system makes it possible in particular to increase the catalytic conversion of the contaminating entities, in particular in an engine operating with a lean mixture.

In order to be effective, such a system requires, however, the use of a substance which adsorbs the $NO_x$ compounds.

Currently, no simple catalytic system is however known which makes possible a substantial conversion of $NO_x$ compounds to $N_2$, even in an oxidizing atmosphere, that is to say in the presence of an excess of oxidizing entities of the oxygen or nitrogen oxide $NO_x$ type. One of the aims of the present invention is to overcome such a deficiency by making possible in particular the conversion of a substantial amount of the $NO_x$ entities, whatever the chemical composition of the gas mixture to be purified. In particular, the present catalytic system has an application in the treatment of the exhaust gases resulting from a combustion engine, in particular when the air/fuel ratio of the gaseous medium to be purified is lean. Another application of the catalytic system is the treatment of the gases resulting from a burner used in particular in glass furnaces, comprising, in a known way, high proportions of said $NO_x$ compounds, in particular of $N_2$.

More particularly, the aim of the present invention is to provide a simple and self-sufficient catalytic system which makes possible the direct elimination of contaminants of the $NO_x$ type, in particular $NO_2$, present in a contaminated gas to be treated, said system making possible the conversion of said $NO_x$ compounds to $N_2$ without recourse to an additional material which adsorbs $NO_x$ compounds, in a highly selective fashion, that is to say more than 80 mol %, indeed even more than 90 mol %, of the $NO_x$ compounds converted are converted to $N_2$, it being possible for said system to function whatever the overall atmosphere of the gases to be treated: oxidizing, neutral or reducing, in particular oxidizing, and under low temperature conditions, in particular of less than 500° C.

According to a first aspect, the present invention relates to the use, for the reduction of oxidizing contaminating entities of the $NO_x$ type, in particular $NO_2$, present in a gas to be purified, of a catalytic system comprising or composed of an oxide corresponding to the molar formulation:

$$Ce_{1-y-z}O_{2-x}M_yN_z,$$

in which:
Ce is cerium,
M is an element chosen from: Gd, Y, Sc, Sm, La, Pr, Nd, Er or Tb,
y is between 0.01 and 0.4,
N is an element having several degrees of valency chosen from: Ti, V, Cr, Mn, Fe, Co, Ni or Cu,
z is less than 0.4,
x is greater than 0.05.

The electronic resistivity of the ion- and electron-conducting oxide is less than 20 ohms·cm at 400° C. and its ionic conductivity is between 1 and $10^{-4}$ siemens/cm at 400° C.

According to preferred but nonlimiting embodiments of the invention:
y is between approximately 0.1 and approximately 0.3 and in which z=0,
the ion- and electron-conducting oxide corresponds to the formula $Ce_{1-y-z}O_{2-x}M_y$, and in which y is between approximately 0.1 and approximately 0.3,
the ion- and electron-conducting oxide corresponds to the formula $Ce_{1-y}O_{2-x}Gd_y$, and in which y is between approximately 0.1 and approximately 0.3,
z is greater than 0 and preferably between 0.01 and 0.2,
the ion- and electron-conducting oxide corresponds to the formula $Ce_{1-y-z}O_{2-x}Y_yTi_z$, in which y is between approximately 0.1 and approximately 0.3 and in which z is between 0.01 and 0.1,
x is between 0.1 and 0.4, preferably between 0.1 and 0.3,
the oxide comprises oxygen gaps and a portion of the $Ce^{4+}$ cations of the crystal lattice is converted to $Ce^{3+}$ cations. According to the invention, the proportion of the $Ce^{3+}$ ions is preferably between 25 and 75%, in particular between 40 and 70%. The expression "proportion of the $Ce^{3+}$ cations" is understood to mean the proportion of the trivalent cations, as calculated according to the ratio $Ce^{3+}/Ce^{4+}$. The method for determining such a ratio by magnetic susceptibility measurements is well known and is described, for example, in the publication "Catalysis Today, vol. 54, pages 93-100 (1999)",
the ion- and electron-conducting oxide exhibits a specific surface of between 0.5 and 100 $m^2/g$, preferably between 1 and 30 $m^2/g$.

According to a possible and advantageous form of the invention, the catalytic system as described above does not require additional metals, in particular precious metals, of the type of those known to date to promote the conversion or the reduction of $NO_x$ compounds to $N_2$, in particular those based on the Rh, Cu or Ni type.

According to another aspect of the invention, in particular if the proportion of NO is relatively high with respect to the amount of $NO_2$ present in the gas to be treated, it may, however, be of use to incorporate, in the catalytic system, a selective catalyst for the conversion (oxidation) of nitrogen monoxides NO to nitrogen dioxide $NO_2$. The expression "selective catalyst for the oxidation of NO to $NO_2$" is understood to mean a catalyst which makes possible the conversion of more than 50 mol % of NO to $NO_2$, preferably more than 75 mol %, indeed even more than 80 mol % or even more than 85 mol % of NO to $NO_2$. Without this being able to be regarded as a restriction on the scope of the present invention, in the context of the research studies carried out for the development of the present invention, it had been observed, surprisingly, that the catalytic system according to the invention makes possible an extremely selective and effective reduction of nitrogen dioxide $NO_2$ to $N_2$ but a substantially lower activity for the conversion of nitrogen monoxides $NO/N_2O$ to $N_2$. Thus, for the purification of gases comprising a substantial amount of $NO/N_2O$, it can thus be envisaged, according to the present invention, to incorporate, in the catalytic system according to the invention, such an oxidation catalyst, for example comprising platinum Pt, indeed even other metals, such as Pd, Ag, Fe, Co or Au, in particular by known impregnation techniques, on the oxide of formulation $Ce_{1-y-z}O_{2-x}M_yN_z$.

The catalytic system used according to the invention can be employed according to different possible forms, according to any known technique of the art.

Structures of powder bed type, for example, can comprise oxide powder, which oxide is composed of or incorporates a system used according to the invention.

Filtering or nonfiltering inorganic structures formed of porous walls made of inorganic material, for example a ceramic material, or structures of foam type are also capable of being composed of or supporting cerium oxide corresponding to the molar formulation described above. In particular, according to one possible embodiment, the porous inorganic structure is impregnated with an aqueous solution comprising particles of cerium oxide corresponding to the above molar formulation or its precursors.

According to one possible form, the inorganic material constituting all or part of the inorganic structure is chosen from the following list, alone or in combination: metal or sintered metal, cordierite, aluminum titanate, alumina, mullite, silicon nitride or silicon carbide. Structures made of electron-conducting inorganic material, such as silicon carbide, or metals make it possible to regenerate the catalytic system by polarization.

The catalytic system as described above can advantageously be used in a structure for the decontamination and/or filtration of a gas laden with gaseous contaminants and optionally with solid particles, in particular an exhaust gas from a motor vehicle, composed of a porous inorganic material on which said catalytic system is deposited. The present invention is thus very particularly applied in the structures used for the purification and the filtration of an exhaust gas from a diesel engine. Such structures, generally denoted under the term "particle filters", comprise at least one and preferably a plurality of monolithic honeycomb blocks. Unlike the purification devices described above, in such filters, said block or blocks comprise a combination of adjacent conduits or channels with axes parallel to one another separated by porous walls, blocked off by plugs at one or other of their ends in order to delimit inlet conduits which open on a face for admitting the gases and outlet conduits which open on a face for discharging the gases, in such a way that the gas passes through the porous walls. Examples of such assembled or nonassembled structures are described, for example, in the publications EP 0 816 065, EP 1 142 619, EP 1 306 358 or EP 1 591 430.

In such filtering structures, the gases are forced to pass through the walls. The studies carried out by the Applicant Company have shown that the use of an electrochemical catalyst system as described above makes possible, surprisingly, on the one hand, very good conversion of the contaminating entities without, however, substantially increasing the pressure drop generated by the introduction of the filter onto the exhaust line.

Among the main advantages of the invention, it may in particular be indicated that:

the catalytic system makes possible the conversion of $NO_x$, oxidizing contaminating entities even if the atmosphere of the gases is oxidizing overall, that is to say in particular in the case of the treatment of exhaust gases resulting from an air/fuel lean initial mixture, in contrast to the systems already described in the field, the catalytic system according to the invention is self-sufficient, that is to say that it makes possible the continuous conversion of $NO_x$ compounds to $N_2$ without the assistance of an additional compound which makes possible the prior storage of the $NO_x$ compounds before the treatment thereof.

The present invention relates in addition to the use of a catalytic system as described above for the decontamination of a gas resulting from a glass furnace.

The invention and its advantages will be better understood on reading the following nonlimiting examples:

EXAMPLES

Example 1

An oxide with the general composition $Ce_{0.75}Y_{0.2}Ti_{0.05}O_2$ was first prepared according to the following method:

A precursor of the oxide is synthesized by a sol-gel method, by mixing the reactants given below in equivalent proportions in order to obtain, in the starting mixture, in moles: 0.2 part of Y, 0.75 part of Ce and 0.05 part of Ti.

The following reactants (salts) were used:

yttrium acetate tetrahydrate $Y(CH_3COO)_3 \cdot 4H_2O$ (99-102%, Alfa Aesar), cerium nitrate hexahydrate $Ce(NO_3)_3 \cdot 6H_2O$ (99.99%, Alfa Aesar), titanium isopropoxide $Ti(OC_3H_5)_4$ (99.9%, Alfa Aesar).

According to a first stage, precursor salts are dissolved in ultrapure distilled water. A solution of salts and an organic solution are prepared. The precursor salts, in the proportions desired in order to obtain the compound $Ce_{0.75}Y_{0.2}Ti_{0.05}O_2$, as described above, are dissolved in ultrapure distilled water at ambient temperature and with stirring.

Water is added until all salts have dissolved. For the synthesis of 10 g of mixed conductor, approximately 130 ml of ultrapure distilled water are added. At the same time, PEG 2000 (Fluka, $HO-(CH_2-CH_2-O)_n-H$) is dissolved in isopropanol (Acros Organics). The isopropanol represents 90% by weight of the organic solution. Dissolution takes place with stirring and at 40° C. The above two solutions are subsequently brought to 55° C. and mixed so that the solution of salts represents 50% by weight of the final solution. The solution obtained is subsequently placed on a rotary evaporator at 60° C. for 1 h 30 in order to promote homogenization.

The PEG 2000 creates a three-dimensional periodic polymeric network in which the salts can be incorporated. The drying and the evaporation of the solvent take place on the rotary evaporator under reduced pressure ($P_{atm}-1100$ mbar) and at 65° C.

The stage of removal of the organic compounds is carried out by heating under air at 600° C. for 30 minutes. The rise gradient is 50° C./h. The preceding gel is placed in an alumina crucible in order to be certain of removing all the organic residues. The oxide thus recovered, with the composition $Ce_{0.75}Y_{0.2}Ti_{0.05}O_2$, exhibits a yellow color after manual grinding in a mortar. Its specific surface is measured by a conventional surface analysis according to the BET method. This method for measuring specific surface by adsorption of inert gas was developed by S. Brunauer, P. H. Emmett and J. Teller and is well known to a person skilled in the art. Its specific surface is approximately 57 $m^2/g$.

The oxide is subsequently treated in order to obtain the catalytic system according to the invention, that is to say reduced, under conditions which make it possible to obtain a state highly deficient in oxygen ions of the crystal lattice of the oxide. More specifically, the oxide is subjected to a reduction under pure $H_2$ (>99.99% by weight) at a temperature exceeding or close to 600° C. and for a period of time sufficient (at least one hour) to obtain a state highly deficient in oxygen, that is to say an oxide with the general formulation $Ce_{0.75}Y_{0.2}Ti_{0.05}O_{1.7}$ (x=0.3).

The degree of deficiency x in oxygen of the oxide (or oxygen substoichiometry) was evaluated according to the invention according to conventional techniques, by the temperature-programmed reduction (TPR) technique. The samples are heated under an atmosphere comprising $H_2$ ($H_2$/He mixture with 1 mol of $H_2$, 1.8 l/h, 10° C./minute) up to 900° C. The hydrogen consumption is directly correlated with the parameter x according to well-known techniques.

The hydrogen consumption is directly correlated with the parameter x according to well-known techniques. More specifically, the value of x is obtained on the basis of the hydrogen consumed by the oxide tested with reference to an oxide which is not deficient in oxygen (for which x=0). The value of x of the deficient oxide is obtained directly by dividing the number of moles of hydrogen gas consumed by the number of moles of the deficient oxide tested.

This stage of high-temperature reduction under a hydrogen atmosphere according to the invention makes it possible to remove a portion of the oxygens not only at the surface but also throughout the volume of the oxide, with creation of oxygen gaps throughout the crystal lattice. At the same time, without this being able to be regarded as a definite and limiting assertion, such a stage of creation of oxygen gaps might be accompanied by partial conversion of a portion of the $Ce^{4+}$ cations of the lattice to $Ce^{3+}$ cations. A first catalytic system according to the invention is thus obtained.

Comparative Example 1

According to this comparative example 1, example 1 was reproduced identically except that the final stage of reduction, that is to say of removal of a portion of the oxygens from the crystal lattice of the oxide, was not carried out. Thus, in the end, according to this example, an oxide with the general formulation $Ce_{0.75}Y_{0.2}Ti_{0.05}O_2$ with a specific surface of 57 $m^2/g$ is obtained, this time without oxygen gaps.

Example 2

According to this example, the oxide synthesized according to example 1, with the composition $Ce_{0.75}Y_{0.2}Ti_{0.05}O_2$ and with a specific surface of 57 $m^2/g$, is preheated at 1250° C. for 8 hours under air before the stage of reduction under pure hydrogen. The specific surface measured after the treatment at 1250° C. is reduced to 2 $m^2/g$. The oxide is subsequently subjected to the same treatment under a hydrogen atmosphere and a high temperature as described in the preceding example 1 for a period of time sufficient to obtain an oxide highly deficient in oxygen. The reducing treatment is prolonged until the substoichiometric oxide corresponds substantially to the following general formula: $Ce_{0.8}Gd_{0.2}O_{1.7}$ (x=0.3), the specific surface of which is this time approximately 2 $m^2/g$.

Comparative Example 2

The experimental preparation protocol is identical to that already described for example 2, except that the final stage of removal of a portion of the oxygens from the crystal lattice of the oxide is not carried out. Thus, in the end, an oxide with the general formulation $Ce_{0.75}Y_{0.2}Ti_{0.05}O_2$ is obtained which is without oxygen gaps.

Example 3

According to this example, another catalytic system deficient in oxygen according to the invention comprising cerium and gadolinium was synthesized.

In a first step, a commercial powder with the stoichiometric molar general formulation $Ce_{0.8}Gd_{0.2}O_2$, supplied by NexTech, was characterized. This powder exhibits a specific surface of 32 $m^2/g$.

The powder is impregnated with a platinum precursor in the form of platinum diamine dinitrite $(NH_3)_2Pt(NO_2)_2$ (Alfa Aesar, 1.7% by weight of Pt) and then poured into a round-bottomed flask and mixed with a solution of platinum precursor and of ultrapure water. The round-bottomed flask is immersed in a water bath and heated at a temperature of 70° C. with stirring for 70 minutes. At the end of stirring, the round-bottomed flask is taken out of the water bath and then cooled at ambient temperature. The round-bottomed flask is subsequently reimmersed and gently heated, under low vacuum, up to 60° C. Once the solvent has been completely evaporated, after approximately 2 hours at 60° C., the powder is dried in an oven at 110° C. for 3 hours and then ground. The catalytic system thus obtained is subsequently calcined under air at 500° C. for one hour. After the impregnation, the oxide with the general formulation $Ce_{0.8}Gd_{0.2}O_2$ comprises approximately 0.3% of Pt with respect to the total weight of the system of the oxide powder and precious metal.

The oxide is subsequently subjected to a treatment under an atmosphere of pure hydrogen and at high temperature (greater than or equal to 600° C.), as described in the preceding example 1, for a period of time sufficient to obtain an oxide highly deficient in oxygen. It was possible, by the conventional temperature-programmed reduction techniques described above, to show that the substoichiometric oxide corresponds substantially to the following general formula: $Ce_{0.8}Gd_{0.2}O_{1.7}$ (x=0.3). A system a first catalytic system according to the invention is thus obtained.

Comparative Example 3

According to this comparative example 3, example 3 was reproduced in an identical fashion, except that the final stage of stringent reduction for the removal of a portion of the oxygens from the crystal lattice of the oxide by reduction was not carried out. Thus, in the end, according to this example, an oxide with the general formulation $Ce_{0.8}Gd_{0.2}O_2$ is obtained which comprises platinum but which is without oxygen gaps.

Example 4

According to this example according to the invention, a fourth catalytic system is prepared composed of an oxygen-deficient oxide which is identical to that described in example 3 but which is not impregnated with platinum. The experimental preparation protocol is identical to that already described for example 3 apart from the stage of impregnation of the oxide with Pt. Thus, in the end, according to this example, a Pt-free catalytic system is obtained composed of an oxide with the general formulation $Ce_{0.8}Gd_{0.2}O_{1.7}$.

Comparative Example 4

According to this comparative example 4, example 4 was reproduced in an identical fashion, except that the final stage of stringent reduction for the removal of a portion of the oxygens from the crystal lattice of the oxide by reduction was not carried out. Thus, in the end, according to this example, an oxide with the general formulation $Ce_{0.8}Gd_{0.2}O_2$ is obtained which is without oxygen gaps and which is devoid of Pt.

Example 5

According to this example according to the invention, a fifth catalytic system according to the invention is prepared consisting of an oxygen-deficient oxide identical to that described in example 4 but in which the stage of reduction of the oxide is carried out under less stringent conditions. More specifically, the oxide is subjected to a reduction under pure $H_2$ at a temperature of 450° C. for one hour, an oxide with the general formulation $Ce_{0.8}Gd_{0.2}O_{1.9}$ (x=0.1) being obtained in the end.

exhaust gas resulting from a diesel engine operating as a lean mixture or of a gas resulting from a burner of a glass furnace.

Inline analysis of the gases is provided by an infrared analyzer for NO and $N_2O$ and an ultraviolet analyzer for $NO_2$ and by a microchromatograph equipped with two analytical modules and two catharometric detectors for the analysis of the oxygen and nitrogen. The change in the concentrations of NO, $NO_2$, $N_2$ and $N_2O$ in the gases to be treated is monitored as a function of the time for approximately 2 hours from the introduction of the $NO_2$/He mixture over the catalyst. An overall molar percentage of conversion of the $NO_x$ compounds to $N_2$ by the catalytic system over this whole period is then calculated, as given in tables 1 and 2.

The selectivity of the catalyst for $N_2$, that is to say its ability to exclusively convert the $NO_x$ compounds to $N_2$, is also confirmed at the outlet of the device.

The results obtained are set out in the following tables 1 and 2:

TABLE 1

| Sample: $Ce_{0.75}Y_{0.2}Ti_{0.05}O_{2-x}$ | Specific surface ($m^2$/g) | x | Conversion of the $NO_2$ compounds to $N_2$ after 2 hours (%) | Total amount of $N_2$ produced (per μmol · $g^{-1}$ of catalyst) | Selectivity for $N_2$ (%) |
|---|---|---|---|---|---|
| Example 1 | 57 | 0.3 | 59 | 438 | 100 |
| Comparative Example 1 | 57 | 0 | 0 | 0 | 0 |
| Example 2 | 2 | 0.3 | 26 | 243 | 90 |
| Comparative Example 2 | 2 | 0 | 0 | 0 | 0 |

TABLE 2

| Sample: $Ce_{0.8}Gd_{0.2}O_{2-x}$ | Specific surface ($m^2$/g) | Pt | x | Conversion of the $NO_2$ compounds to $N_2$ after 2 hours (%) | Total amount of $N_2$ produced (per μmol · $g^{-1}$ of catalyst) | Selectivity for $N_2$ (%) |
|---|---|---|---|---|---|---|
| Example 3 | 32 | yes | 0.3 | 32 | 239 | 100 |
| Comparative Example 3 | 32 | yes | 0 | 0 | 0 | 0 |
| Example 4 | 32 | no | 0.3 | 48 | 356 | 100 |
| Comparative Example 4 | 32 | no | 0 | 0 | 0 | 0 |
| Example 5 | 32 | no | 0.1 | 32 | 240 | 100 |

Test of Conversion of the $NO_x$ Compounds

The samples of the preceding examples according to the invention and comparative examples, finely ground in the form of a powder, are placed in a U-shaped quartz fixed-bed reactor. More specifically, approximately 500 mg of the catalytic system are introduced into the reactor equipped with a porous sintered quartz filter supporting the powder. The volume of the catalyst is of the order of 0.3-0.4 $cm^3$. The catalyst is heated under a stream of He (5 l/h) at 250° C. and at atmospheric pressure. Once the temperature of 250° C. has stabilized, a reaction mixture composed of an $NO_2$/He mixture is introduced over the catalyst according to a total flow rate of 10 l/h and an hourly space velocity of between 25 000 and 35 000 $h^{-1}$. The gas mixture to be decontaminated initially comprises 500 ppm of $NO_2$. It is representative of a highly oxidizing atmosphere, in the sense, for example, of an The results obtained, in particular those given in the above tables 1 and 2, show that the catalytic systems according to the invention (examples 1 to 5) have the surprising capability of being able to reduce $NO_2$ to nitrogen even in a highly oxidizing medium. Under the same conditions, the samples of comparative examples 1 to 4, which are not deficient in oxygen, do not succeed in reducing the $NO_2$ compounds to $N_2$.

The comparison between example 1 and example 2 shows that the catalytic systems according to the invention can convert the $NO_x$ compounds to $N_2$ even if they exhibit very low specific surfaces, while retaining a good selectivity. The selectivity of the systems according to the invention is very high. The selectivity was determined by measuring the percentage of $N_2$ produced (in μmol) with respect to the amount of the $NO_x$ compounds converted ($N_2$+$N_2O$) by the catalytic system throughout the duration of the test (6500 seconds). In this case, the systems according to the invention do not show the presence of $NO_x$ compounds converted to $N_2O$ as the selectivity is 100%.

The comparison between example 3 and example 4 indicates that the presence of a precious metal is not necessary for the catalytic reaction. The presence of platinum on the oxygen-deficient oxide can even under some conditions result in a decrease in the degree of conversion of the $NO_x$ compounds, which appears extremely surprising, in particular when the gas to be treated very predominantly comprises nitrogen dioxide. However, other tests carried out by the Applicant have shown that the presence of a catalyst based on noble metals, such as Pt, could, however, be advantageous when the gas to be treated this time comprises significant amounts of nitrogen monoxide.

Example 5, to be compared with example 4, shows that the effect of conversion of the $NO_x$ compounds can be directly correlated with the oxygen-deficient state of the crystal lattice, the degree of conversion of the $NO_x$ compounds decreasing with the value of the degree x of oxygen gaps of the crystal lattice of the oxide.

In addition, according to a property not yet described to date, a significant conversion of the contaminants is observed at a low temperature, that is to say from 250° C., whereas the normal catalysts are active at much higher temperatures. For example, current three-way catalysts, in particular zeolites, are mainly active between 700 and 1000° C.

Measurement of the Proportion of $Ce^{3+}$ Ions

The proportion of the cations is measured in the oxide by the $Ce^{3+}/Ce^{4+}$ ratio, obtained by means of magnetic susceptibility measurements (also known as Magnetic Balance Measurement), in a way well-known in the field. For the examples according to the invention, the proportion of $Ce^{3+}$ ions is of the order of 40 to 60%.

Measurement of the Ionic and Electronic Conductivities

The conductivities of the oxide can be measured by conventional impedance techniques, for example as described in the publication "*Acta Materialia*, vol. 56, pages 4658-4672 (2008)". The ionic and electronic conductivities of the samples according to the examples according to the invention are much lower than those of the comparative examples and are the only ones to be in accordance with the subject matter of the present invention: electronic resistivity less than 20 ohms·cm at 400° C. and ionic conductivity between 1 and $10^{-4}$ siemens/cm at 400° C.

What is claimed is:

1. A process for reducing an $NO_x$ contaminants from a gas, the process comprising:
contacting a gas comprising $NO_x$ with a catalytic system comprising an oxide of formula (I):

$$Ce_{1-y-z}O_{2-x}M_yN_z \qquad (I),$$

wherein:

Ce is cerium;
M is Gd, Y, Sc, Sm, La, Pr, Nd, Er, or Tb;
y is from 0.01 to 0.4;
N is Ti, V, Cr, Mn, Fe, Co, Ni, or Cu;
z is less than 0.4; and
x is greater than 0.05,
wherein the electronic resistivity of the oxide is less than 20 ohms·cm at 400° C. and has an ionic conductivity from 1 to $10^{-4}$ siemens/cm at 400° C.

2. The process of claim 1, wherein y is from 0.1 to 0.3 and z=0.

3. The process of claim 2, wherein the oxide has formula $Ce_{1-y}O_{2-x}M_y$, wherein y is from 0.1 to 0.3.

4. The process of claim 3, wherein the oxide has formula $Ce_{1-y}O_{2-x}Gd_y$, wherein y is from 0.1 and to 0.3.

5. The process of claim 1, wherein z is greater than 0.

6. The process of claim 5, wherein the oxide has formula $Ce_{1-y-z}O_{2-x}Y_yTi_z$, wherein y is from 0.1 to 0.3 and z is from 0.01 to 0.1.

7. The process of claim 1, wherein the oxide comprises oxygen gaps and a portion of $Ce^{4+}$ cations of the crystal lattice are converted to $Ce^{3+}$ cations.

8. The process of claim 7, wherein the proportion of the $Ce^{3+}$ ions, as given by the ratio $Ce^{3+}/Ce^{4+}$, is from 25 to 75%.

9. The process of claim 1, wherein x is from 0.1 to 0.4.

10. The process of claim 1, wherein the oxide exhibits a specific surface from 0.5 to 100 m$^2$/g.

11. The process of claim 1, wherein the catalytic system further comprises:
an element selective to reactions for oxidizing the $NO_x$ compounds to $NO_2$.

12. A process for decontaminating and/or filtering a gas comprising gaseous contaminants and optionally solid particles, the processing comprising:
contacting the gas with a structure comprising a porous inorganic material comprising a catalytic system comprising an oxide of formula (I):

$$Ce_{1-y-z}O_{2-x}M_yN_z \qquad (I),$$

wherein:

Ce is cerium;
M is Gd, Y, Sc, Sm, La, Pr, Nd, Er, or Tb;
is from 0.01 to 0.4;
N is Ti, V, Cr, Mn, Fe, Co, Ni, or Cu;
z is less than 0.4; and
x is greater than 0.05,
wherein the electronic resistivity of the oxide is less than 20 ohms·cm at 400° C. and has an ionic conductivity from 1 to $10^{-4}$ siemens/cm at 400° C.

13. The process of claim 1, wherein the gas is obtained from a glass furnace.

* * * * *